United States Patent
Lu et al.

(10) Patent No.: US 11,940,136 B1
(45) Date of Patent: Mar. 26, 2024

(54) ULTRA-THIN NARROW-BEZEL PANEL LIGHT

(71) Applicant: Xiamen PVTECH Co., Ltd., Fujian (CN)

(72) Inventors: Fuxing Lu, Fujian (CN); Sishan Liao, Fujian (CN); Minghua Cai, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 18/143,595

(22) Filed: May 4, 2023

(30) Foreign Application Priority Data

Nov. 24, 2022 (CN) .......................... 202211484564.8

(51) Int. Cl.
*F21V 23/06* (2006.01)
*F21V 15/01* (2006.01)

(52) U.S. Cl.
CPC .............. *F21V 23/06* (2013.01); *F21V 15/01* (2013.01)

(58) Field of Classification Search
CPC .................................. F21V 23/06; F21V 15/01
See application file for complete search history.

(56) References Cited

U.S. PATENT DOCUMENTS 9,546,781 B2 * 1/2017 Myers ..................... F21V 23/02

* cited by examiner

*Primary Examiner* — Mary Ellen Bowman
(74) *Attorney, Agent, or Firm* — Winston Hsu (57) ABSTRACT

An ultra-thin narrow-bezel panel light includes a base plate and a bezel surrounding the base plate. The base plate includes a plurality of side walls and an accommodating portion between the side walls, and the height of the base plate is 18 mm~26 mm. Each of the side walls has a connecting side and the side walls are installed and fixed on the bezel via the connecting sides thereof, such that the overall height of the panel light can be reduced to 20 mm~28 mm. Thus, the panel light can be ultra-thin, low-cost and of narrow bezel.

9 Claims, 10 Drawing Sheets

ULTRA-THIN NARROW-BEZEL PANEL LIGHT

BACKGROUND OF THE INVENTION

1. Field of the Invention

The present invention relates to a lighting device, in particular to an ultra-thin, narrow-bezel and low-cost panel light.

2. Description of the Prior Art

LED panel lights are of good illumination uniformity and high brightness. Besides, the light emitted thereby is soft and comfortable, which can effectively relieve the fatigue of the eyes of users. However, the currently available panel lights still have the following shortcomings. (1) The overall thicknesses of these panel lights are high, which increase the transportation cost and the overall appearances thereof. (2) The widths of the bezels thereof are high, which increases the material cost thereof and further influence the overall appearances thereof. (3) The power boxes thereof need isolation circuits, which further increases the cost thereof. (4) The power supply boxes are external components, which not only influences the convenience of packaging and transportation, but also needs additional packaging materials and further increases the transportation cost. (5) The currently available replaceable power sources need additional terminal wires, which are very expensive.

SUMMARY OF THE INVENTION

Therefore, one of the primary objectives of the present invention is to provide an ultra-thin, narrow-bezel and low-cost panel light.

One embodiment of the present invention provides an ultra-thin narrow-bezel panel light, which includes a base plate and a bezel surrounding the base plate. The base plate includes a plurality of side walls and an accommodating portion between the side walls, and the height of the base plate is 18 mm~26 mm. Each of the side walls has a connecting side and the side walls are installed and fixed on the bezel via the connecting sides thereof, such that the overall height of the ultra-thin narrow-bezel panel light can be 20 mm~28 mm.

In one embodiment, the connecting side has a recess adjacent to the inner side of the bezel.

In one embodiment, the bezel is formed by several thin bars. The thickness of the bezel is 0.5 mm~3 mm and the width of the bezel is 10 mm~20 mm.

In one embodiment, the ultra-thin narrow-bezel panel light further includes a power box disposed between the base plate and the bezel. The power box has a plurality of zones for containing a power source, connecting terminals and a quick-connecting terminal respectively.

In one embodiment, the power box has a detachable cover and a main body. Each of sides of the detachable cover is provided with a plurality of first teeth and the main body is provided with a plurality of second teeth engaged with the first teeth.

In one embodiment, the wire outlet of the detachable cover is provided with a plurality of third teeth and the wire outlet of the main body is provided with a plurality of fourth teeth. A wire is clamped by the third teeth and the second teeth.

In one embodiment, the edge of the base plate is provided with a bending portion, the bezel has a position-limiting recess, and the bending portion is disposed in the position-limiting recess.

In one embodiment, the base plate has a plurality of locking holes and the inner side of the bezel is provided with a groove. A plurality of locking elements penetrate through the locking holes respectively and reach the groove. The ultra-thin narrow-bezel panel light further includes a power box and each of the two sides of the power box is provided with a locking portion. The locking elements penetrate through the locking portions respectively and reach the groove.

In one embodiment, the base plate further has a bottom wall and the side walls are disposed around the bottom wall. The edge of the bottom wall is provided with a reinforcement rib adjacent to the side walls and the height of the reinforcement rib is 1 mm~2 mm.

In one embodiment, any one of the side walls is connected to the side wall adjacent thereto via an inclined portion and the inclination of the inclined portion is 30°~50°. Each of the side walls has an inclined plane and the inclination of the inclined plane is 45°~80°.

To sum up, according to the ultra-thin narrow-bezel panel light the embodiments of the present invention, the height of the base plate is decreased, so the overall height of the panel light can be further reduced after the base plate and the bezel are connected to and fixed with each other. Therefore, the packaging material and the transportation cost can be effectively reduced. In addition, in some embodiments, the bezel is formed by several thin bars and narrow, so the bezel can be ultra-narrow without significantly the structural strength thereof. Further, in some embodiments, the inner space of the power box can be divided into several zones for containing a power source, connecting terminals and a quick-connecting terminal respectively so as to provide different functions.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

In the following detailed description, for purposes of explanation, numerous specific details are set forth in order to provide a thorough understanding of the disclosed exemplary embodiments. It will be apparent, however, that one or more exemplary embodiments may be practiced without these specific details. In other instances, well-known structures and devices are schematically shown in order to simplify the drawing.

Figure 1:
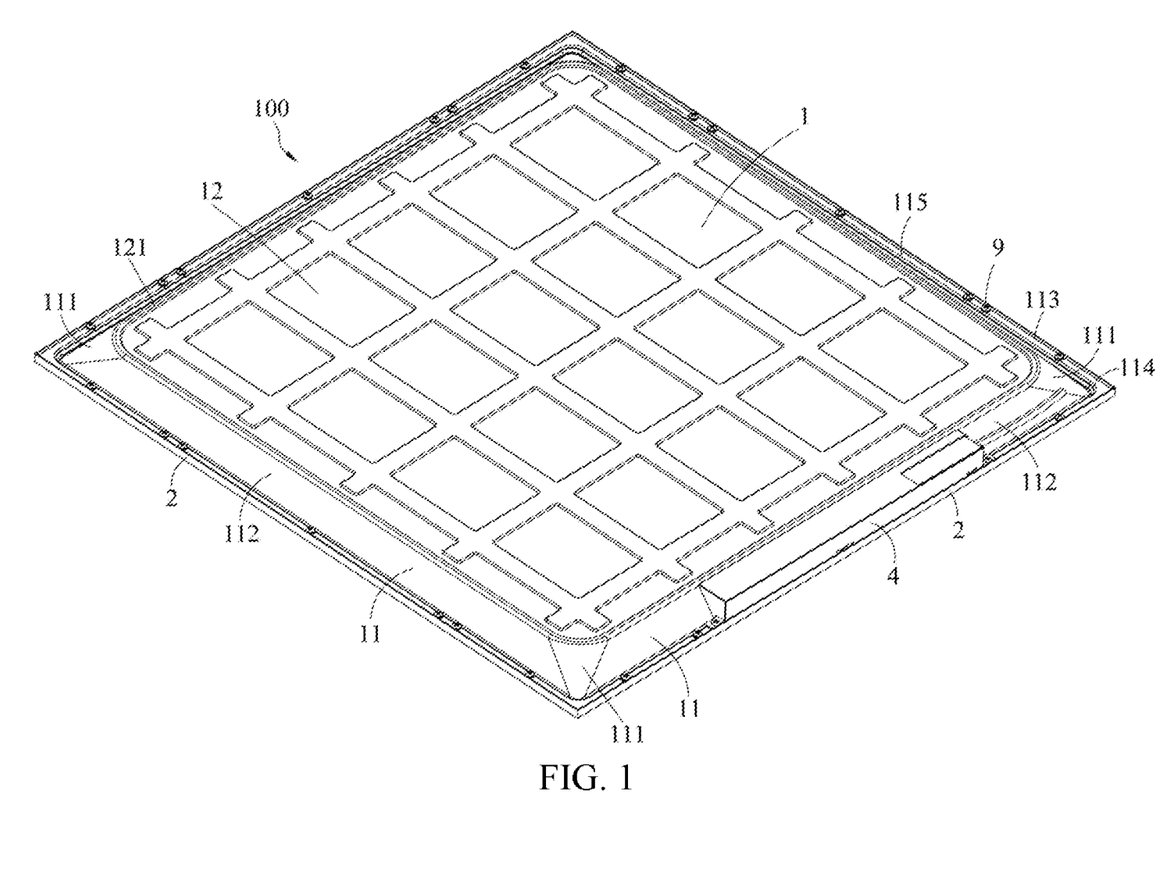
FIG. 1 is a view for illustrating a rear side of an ultra-thin narrow-bezel panel light in accordance with one embodiment of the present invention.

Please refer to FIG. 1, which is a view for illustrating a rear side of an ultra-thin narrow-bezel panel light 100 in accordance with one embodiment of the present invention. The ultra-thin narrow-bezel panel light 100 includes a base plate 1, a bezel 2, a plurality of light source strips 3 (FIG. 7 only shows one of the light source strips 3; several light source strips (e.g., LED strips) can be disposed in the base plate 1 and spaced at regular interval) and a power box 4. In some embodiments, the ultra-thin narrow-bezel panel light 100 can be installed on an external structure, such as a ceiling, a wall, a steel frame, etc.

In some embodiments, the base plate 1 includes a plurality of side walls 11 and an accommodating space formed between the side walls 11.

Figure 7:
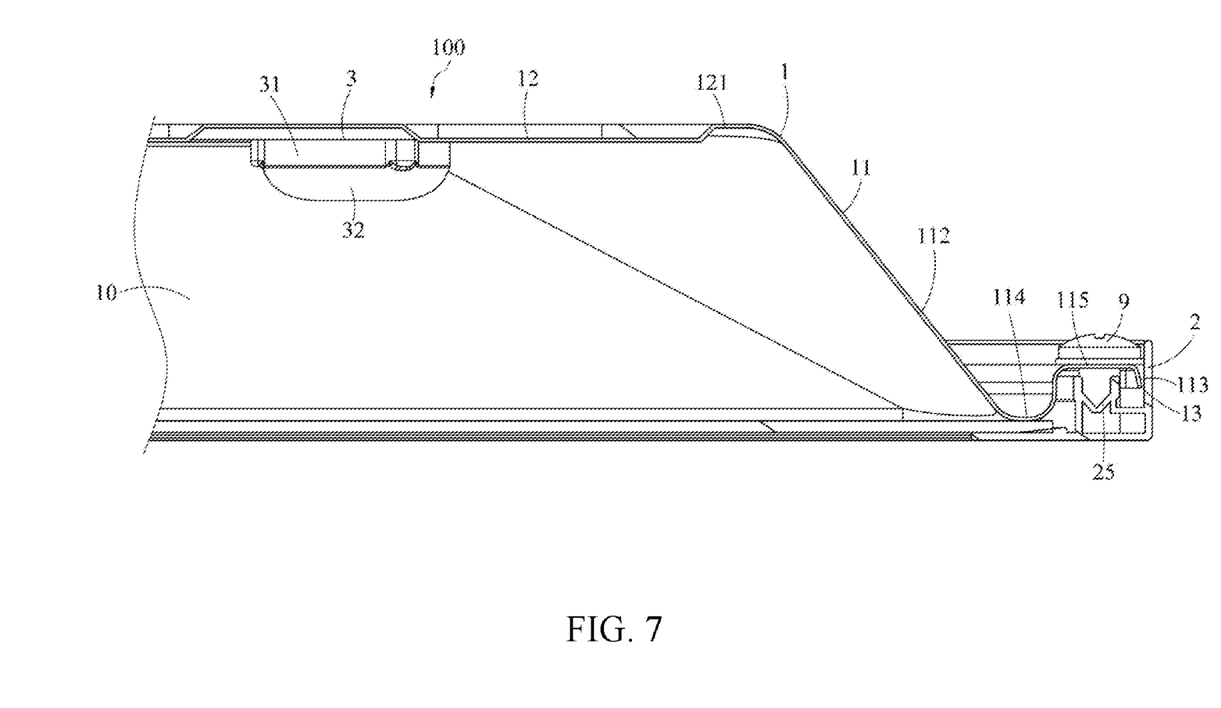
FIG. 7 is another partial enlargement side view of the ultra-thin narrow-bezel panel light in accordance with one embodiment of the present invention, which shows a reinforcement rib around a bottom wall of the base plate.

In some embodiments, the light source strips 3 are disposed in the accommodating space 10 (as shown in FIG. 7) and the power box 4 is disposed between the base plate 1 and the bezel 2. Each light source strip includes a plurality of light sources (e.g., LEDs) and the light source strip 3 can be formed by combining two (or more than two) small light source strips with each other. The way of the ultra-thin narrow-bezel panel light 100 emitting light can be changed by adjusting the lighting emitting angle of the lens 32 (as shown in FIG. 7) covering each of the light sources 31 in order to adjust the diffusing effect.

In some embodiments, the connecting side 113 of each of the side walls 11 extends toward the bezel 2; then, when the connecting side 113 is near the bezel 2, the extending direction thereof turns to a reverse direction. The connecting side 113 of the side wall 11 has a recess 114 adjacent to the inner side of the bezel 2. When the connecting side 113 is installed in the bezel 2, the overall height of the ultra-thin narrow-bezel panel light 100 can be effectively reduced.

Figure 2:
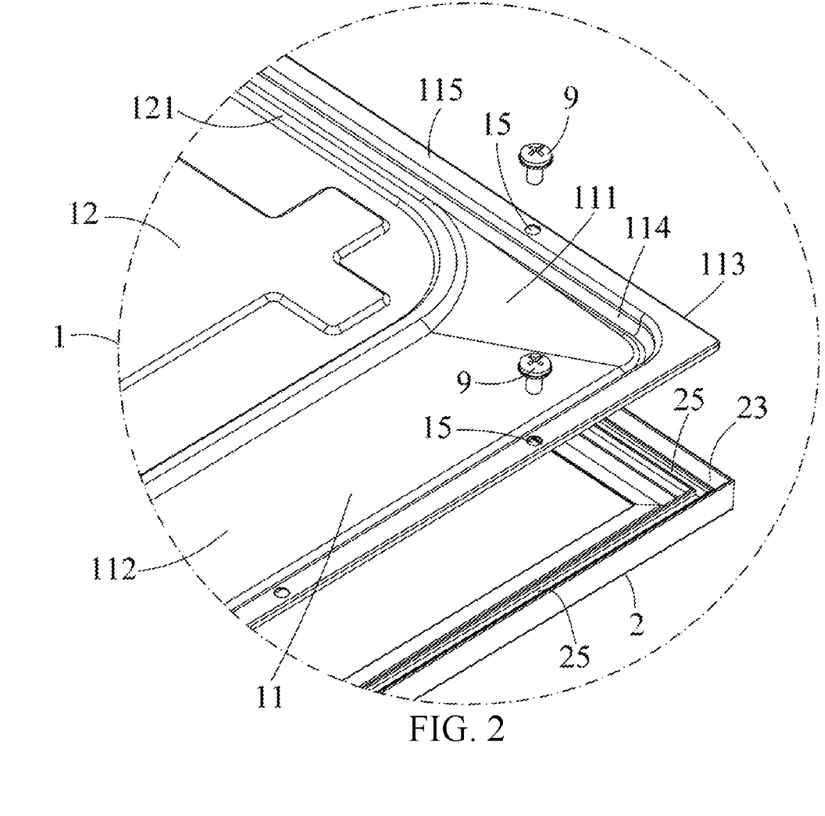
FIG. 2 is a partial enlargement view of the ultra-thin narrow-bezel panel light in accordance with one embodiment of the present invention, which shows a state before a base plate, a bezel and locking elements are connected to each other.
Figure 3:
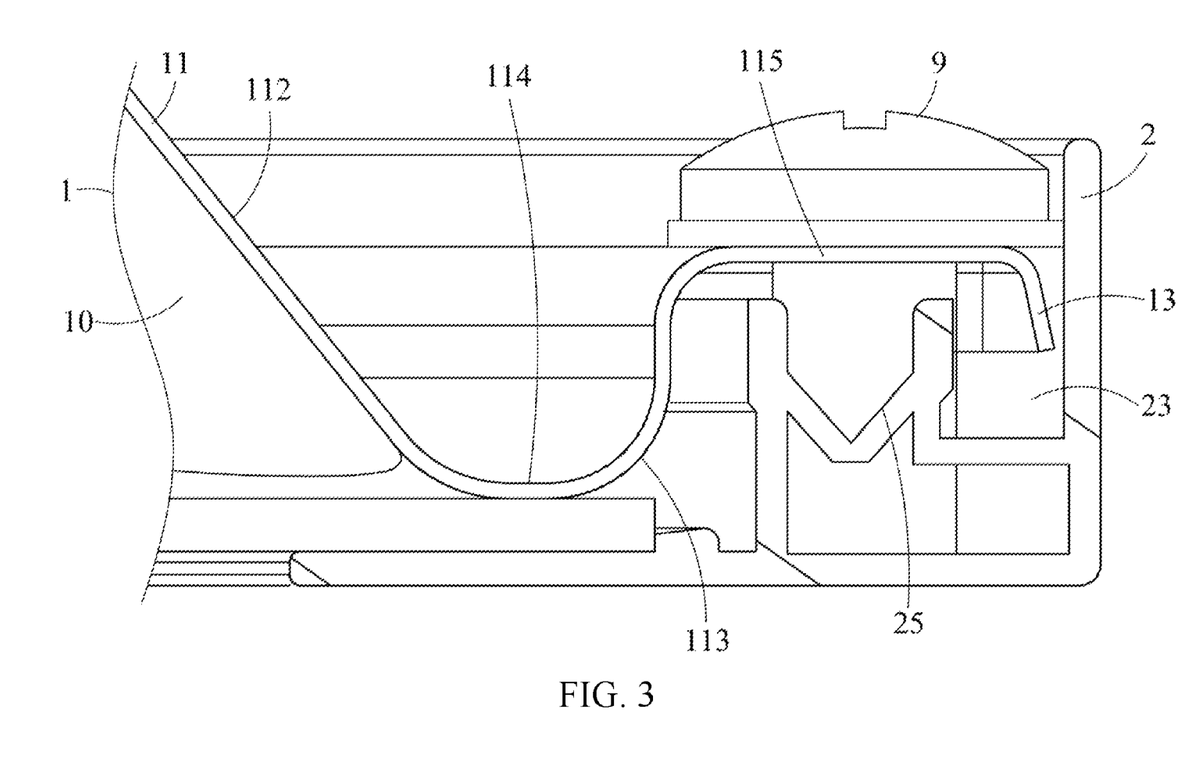
FIG. 3 is a partial enlargement side view of the ultra-thin narrow-bezel panel light in accordance with one embodiment of the present invention, which shows a position relation between a bending portion and a position-limiting recess.

In some embodiments, the cross section of the connecting side 113 of the side wall 11 is close to a trapezoid rotating by 180° (as shown in FIG. 3. FIG. 2 shows the structure of the recess 114). A plane 115 extends from the connecting side 113 of the side wall 11 and the plane 115 is provided with a locking hole 15 (as shown in FIG. 2).

Figure 4:
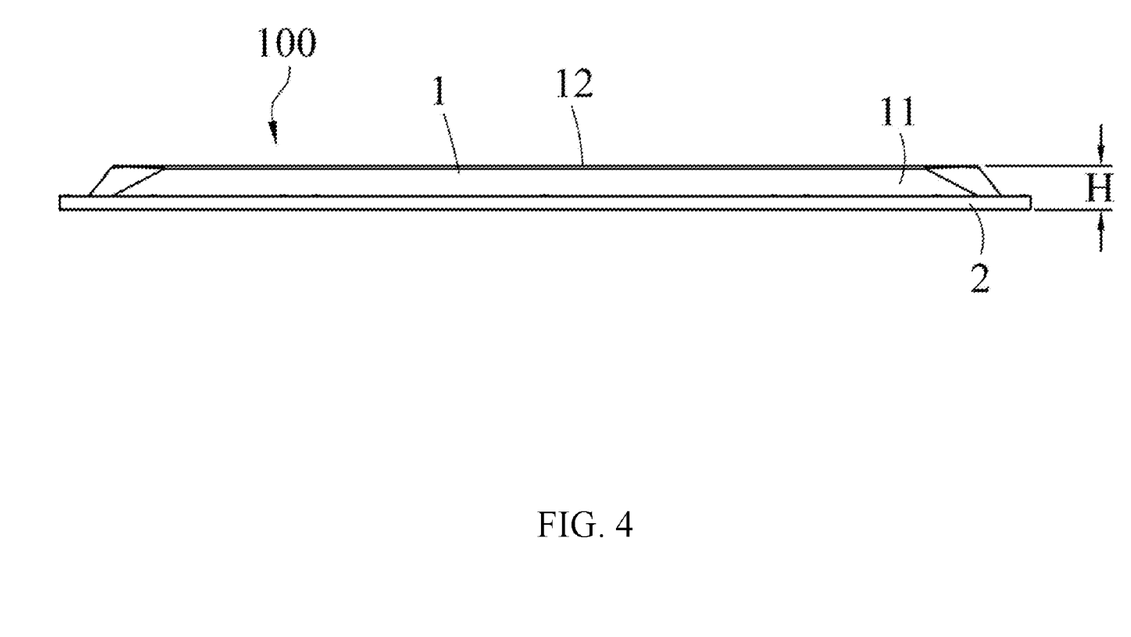
FIG. 4 is a side view of the ultra-thin narrow-bezel panel light in accordance with one embodiment of the present invention.

In some embodiments, the bezel 2 is made of aluminum and the cross section of the bezel 2 is approximately L-shaped. The base plate 1 is combined with the bezel 2 to form a combined structure and the height of the base plate 1 is 18 mm~26 mm. The overall height of the ultra-thin narrow-bezel panel light 100 is 20 mm~28 mm (as shown in FIG. 4). As the overall height of the base plate 1 and the ultra-thin narrow-bezel panel light 100 is decreased, the overall height of the ultra-thin narrow-bezel panel light 100 can be reduced after the base plate 1 and the bezel 2 is combined with each other to form the combined structure. Thus, the packing material and the transportation cost can be effectively reduced. Compared with the currently available common panel light (32 mm), the transportation cost of the ultra-thin narrow-bezel panel light 100 can be reduced by 12.5%~37.5%.

In some embodiments, the bezel 2 can be square (rectangular) formed by four frame strips. The bezel 2 may be an integrally formed frame made by the aluminum extrusion process or a frame formed by combining the four frame strips with each other.

Figure 5:
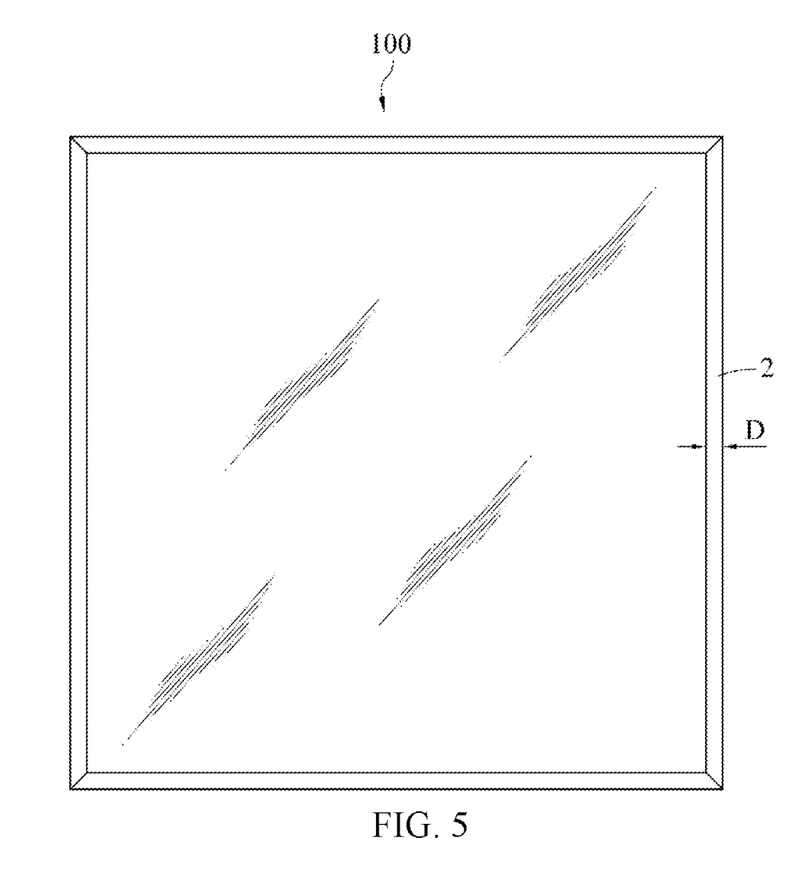
FIG. 5 is a front view of a front side of the ultra-thin narrow-bezel panel light in accordance with one embodiment of the present invention.
Figure 6:
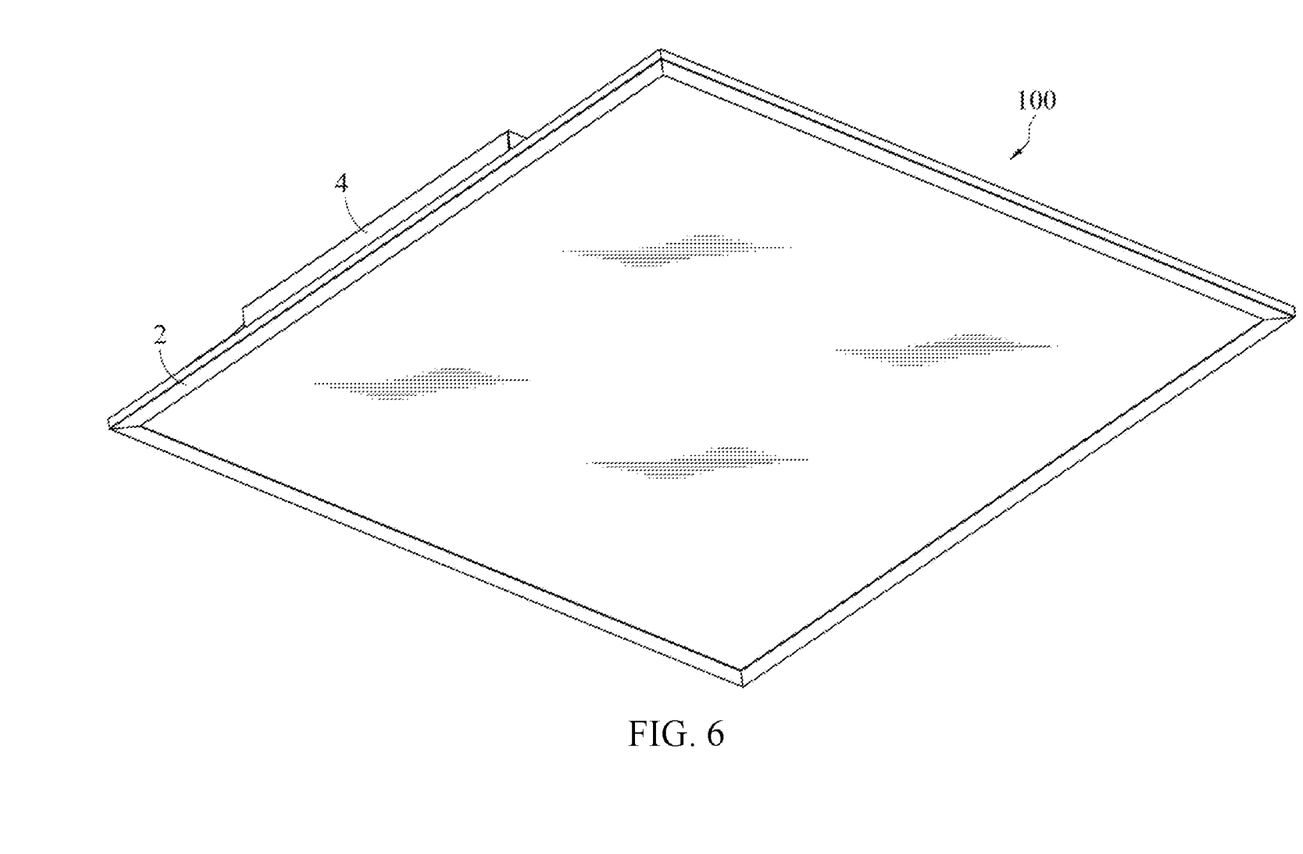
FIG. 6 is a view for illustrating the front side of the ultra-thin narrow-bezel panel light in accordance with one embodiment of the present invention.

In some embodiments, the bezel 2 is formed by several thin bars and the thickness of the bezel 2 is 0.5 mm~3 mm, such that the bezel 2 can be extremely narrow without significantly influencing the structural strength thereof. The width D of the bezel 2 is 10 mm~20 mm (as shown in FIG. 5 and FIG. 6). Preferably, the width D of the bezel 2 is 14 mm~61 mm, which can effectively reduce the material waste and improve the appearance of the ultra-thin narrow-bezel panel light 100. Moreover, the rear supporting structure of the bezel 2 is formed by a thin reinforcement strip 121, which can reduce the material waste by 30% when compared with currently available common product (23 mm).

Please refer to FIG. 2 and FIG. 3. FIG. 2 is a partial enlargement view of the ultra-thin narrow-bezel panel light in accordance with one embodiment of the present invention, which shows the state before the base plate 1, the bezel 2 and the locking elements 9 are connected to each other. FIG. 3 is a partial enlargement side view of the ultra-thin narrow-bezel panel light in accordance with one embodiment of the present invention, which shows the position relation between a bending portion 13 and a position-limiting recess 23. In some embodiments, the edge of the base plate 1 is provided with a bending portion 13. The bezel 2 has a position-limiting recess 23 (the cross section of the position-limiting recess 23 is approximately V-shaped). The bending portion 13 is disposed in the position-limiting recess 23.

In some embodiments, the base plate 1 has a plurality of locking holes 15 and the inner side of the bezel 2 is provided with a groove 25. A plurality of locking elements 9 (e.g., screws, bolts, nails etc.) penetrate through the locking holes 15 respectively and reach the groove 25.

In some embodiments, the edge of the base plate 1 is provided with the bending portion 13, which can be engaged with the position-limiting recess 23 of the edge of the bezel 2 so as to achieve the supporting function and position-limiting function. In this way, the base plate 1 can be accurately combined with the bezel 2, such that the locking holes 15 can be aligned with the position-limiting recess 23. The above structure can avoid that the position of the base plate 1 is changed due to the external force generated when the users tighten the screws.

In some embodiments, the bending portion 13 is inclined and extends toward the position-limiting recess 23, such that several base plates 1 can directly stack during the transportation process in order to reduce the transportation cost.

Please refer to FIG. 6, in some embodiments, the base plate 1 further has a bottom wall 12 and the side walls 11 are disposed around the bottom wall 12. The edge of the bottom wall 12 is provided with a reinforcement rib 121 adjacent to the side walls 11. The height of the reinforcement rib 121 is greater than that of the bottom wall 12, which can enhance the structural strength of the base plate 1. The reinforcement rib 121 is disposed around the bottom wall 12 and the height of the reinforcement rib 121 is 1 mm~2 mm, which can increase the structural strength of the base plate 1 for a certain degree in order to avoid that the base plate 1 is deformed during the manufacturing process.

Figure 8:
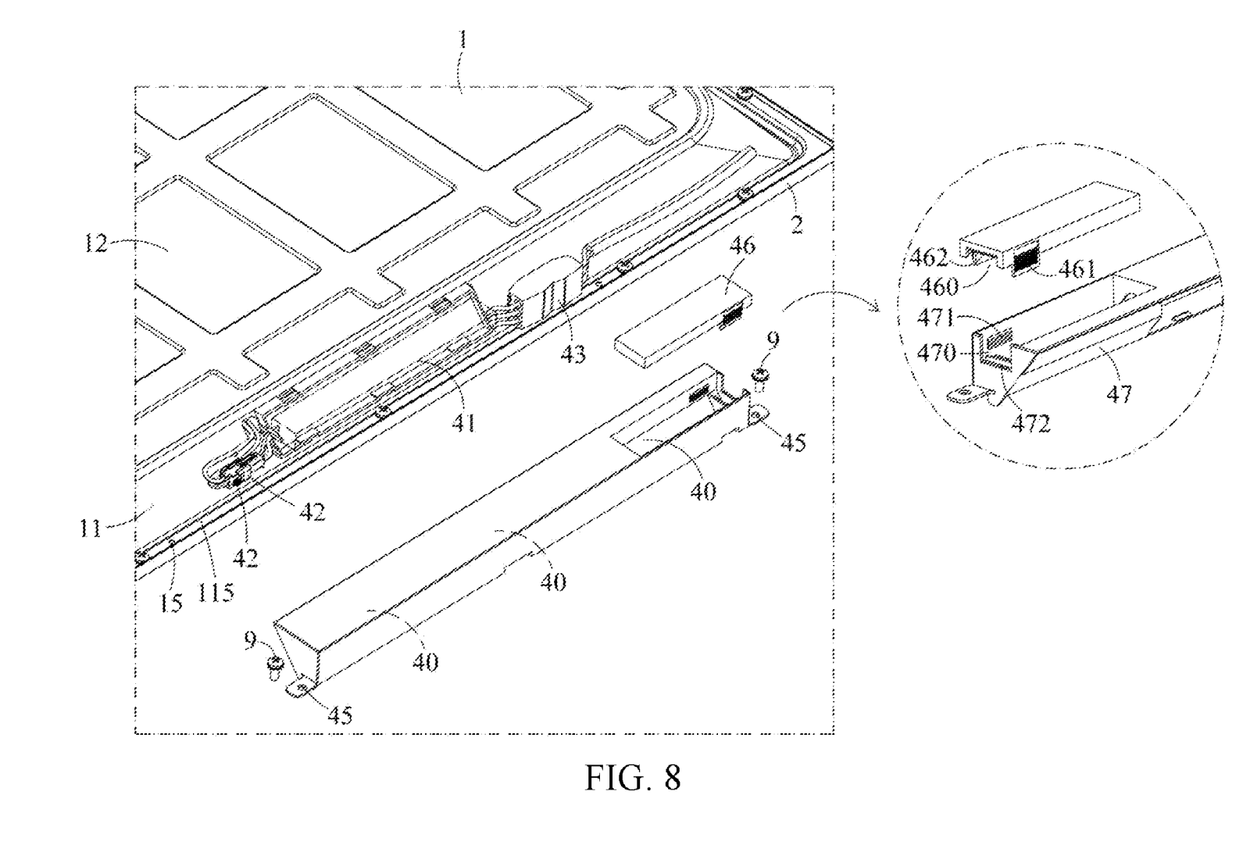
FIG. 8 is an exploded view of a part of the ultra-thin narrow-bezel panel light in accordance with one embodiment of the present invention, which shows components of a power box.

Please refer to FIG. 8, which is an exploded view of a part of the ultra-thin narrow-bezel panel light 100 in accordance with one embodiment of the present invention, which shows the components of the power box 4. In some embodiments, the power box 4 has a plurality of zones 40 for containing a power source 41, connecting terminals 42 and a quick-connecting terminal 43 respectively. The power box 4 may be made of plastics and the inner space can be divided into several sub-spaces. The power source and the wire terminals can be disposed in these sub-spaces respectively. As shown in FIG. 8, the inner space of the power box 4 can be divided into 3 zones 40. The power source 41 is disposed in the middle zone 40. The connecting terminals 42 are disposed in the left zone 40. The quick-connecting terminal 43 is disposed in the right zone 40.

In some embodiments, each of the two sides of the power box 4 is provided with a locking portion 45. Several locking elements 9 (e.g., screws, bolts, nails, etc.) penetrate through the locking portions 45 respectively and reach the groove 25. The power box 4 is replaceable. The user can remove the screws (the locking elements 9) via a screw driver and then the user can see the connecting terminals 42. Afterward, the user can replace the power source after disconnecting the connecting terminals 42 from the power source. The connecting terminals 42 are disposed in the inner space of the power box 4, which can further reduce the cost and improve the overall appearance of the ultra-thin narrow-bezel panel light 100.

In some embodiments, the power box 4 has a detachable cover 46 and a main body 47. Each of the sides of the detachable cover 46 is provided with a plurality of first teeth 461 and the main body 47 is provided with a plurality of second teeth 471 engaged with the first teeth 461. After the detachable cover 46 is combined with the main body 47, the first teeth 461 of the detachable cover 46 are engaged with the second teeth 471 of the main body 47.

In some embodiments, the wire outlet 460 of the detachable cover 46 is provided with a plurality of third teeth 463 and the wire outlet 470 of the main body 47 is provided with a plurality of fourth teeth 472. A wire is clamped by the third teeth 463 and the second teeth 471. The above wire clamping structure for the wire outlet 460 and the wire outlet 470 of the power box 4 can effectively avoid that the wires are pulled out of the power box 4 due to an external force.

In some embodiments, the wire terminals can be disposed in the space formed between the detachable cover 46 and the main body 47 of the power box 4 so as to avoid that the wire terminals are pulled out of the power box 4. Besides, the user can swiftly and convenient execute the wire connecting process. Thus, the installation efficiency can be increased by at least 20%.

Figure 9:
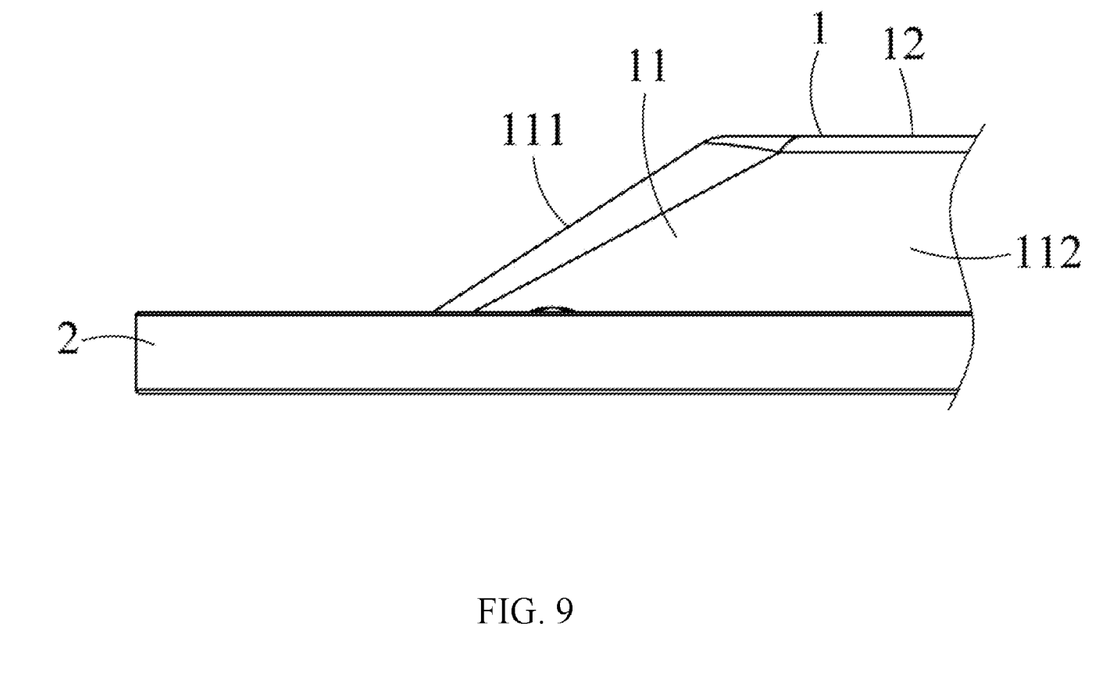
FIG. 9 is a partial side view of the ultra-thin narrow-bezel panel light in accordance with one embodiment of the present invention, which shows a structure of an inclined portion.
Figure 10:
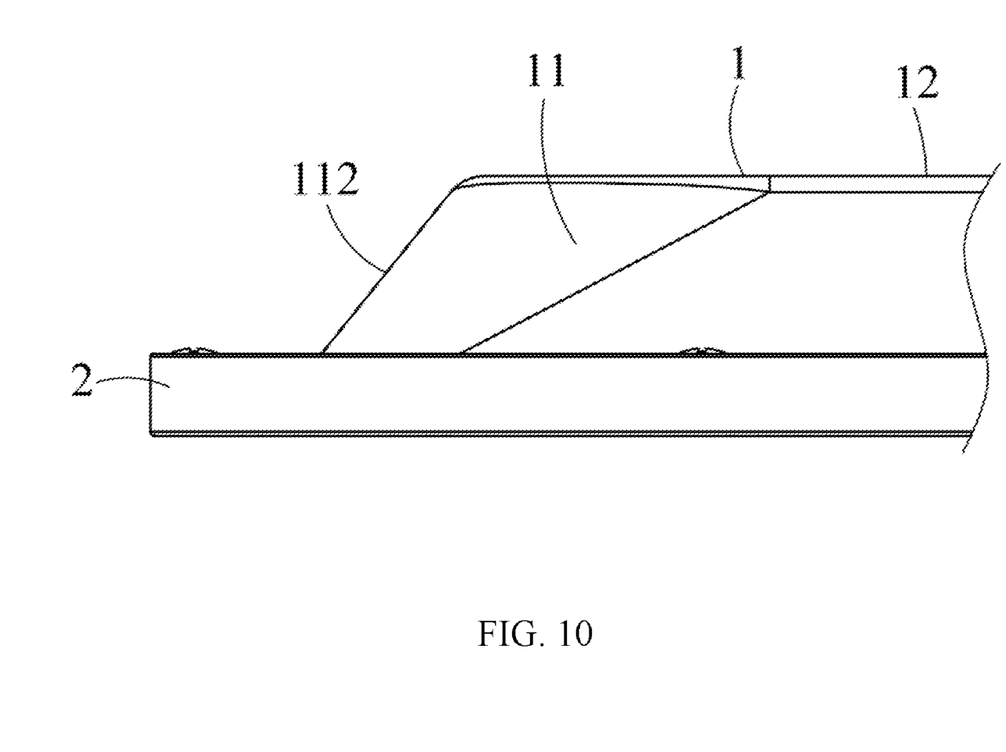
FIG. 10 is another partial side view of the ultra-thin narrow-bezel panel light in accordance with one embodiment of the present invention, which shows a structure of an inclined plane of a side wall.

Please refer to FIG. 9 and FIG. 10. FIG. 9 is a partial side view of the ultra-thin narrow-bezel panel light 100 in accordance with one embodiment of the present invention, which shows the structure of an inclined portion 111. FIG. 10 is another partial side view of the ultra-thin narrow-bezel panel light 100 in accordance with one embodiment of the present invention, which shows the structure of the inclined plane 112 of the side wall 11. In some embodiments, any one of the side walls 11 is connected to the side wall 11 adjacent thereto via an inclined portion 111 (in this embodiment, there are four inclined portions 111 at the four corners) and the inclination of each of the inclined portions 111 is 30°~50°. Each of the side walls 11 has an inclined plane 112 (in this embodiment, the base plate 1 has four side walls 11) and the inclination of each of the inclined planes 112 is 45°~80°. According to the above structure design, the inclination of the inclined portions 111 is decreased) (30°~50° to be less than that of the inclined planes 112)(45°~80°, which can effectively avoid that the four corners of the base plate 1 crease so as to improve the problem of the currently available products.

In some embodiments, the light sources 31 have been covered by a lens and the diffusing angle of the lens is 150°~180°. The lens can increase the lighting range of each of the light sources 31 with a view to decreasing the quantity of the light sources 31 and keeping the thickness of the panel light 100 to be ultra-thin. Further, it is also possible to make sure that the light emitted by the panel light 100 is uniform.

To sum up, according to the ultra-thin narrow-bezel panel light the embodiments of the present invention, the height of the base plate is decreased, so the overall height of the panel light can be further reduced after the base plate and the bezel are connected to and fixed with each other. Therefore, the packaging material and the transportation cost can be effectively reduced. In addition, in some embodiments, the bezel is formed by several thin bars and narrow, so the bezel can be ultra-narrow without significantly the structural strength thereof. Further, in some embodiments, the inner space of the power box can be divided into several zones for containing a power source, connecting terminals and a quick-connecting terminal respectively so as to provide different functions.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ultra-thin narrow-bezel panel light, comprising:
   a base plate comprising a plurality of side walls and an accommodating portion between the side walls, wherein a height of the base plate is 18 mm~26 mm; and
   a bezel surrounding the base plate, wherein each of the side walls has a connecting side and the side walls are installed and fixed on the bezel via the connecting sides thereof, whereby an overall height of the ultra-slim thin-bezel panel light is 20 mm~28 mm, wherein the bezel is formed by several thin bars, a thickness of the bezel is 0.5 mm~3 mm and a width of the bezel is 10 mm~20 mm.

2. The ultra-thin narrow-bezel panel light as claimed in claim 1, wherein the connecting side has a recess adjacent to an inner side of the bezel.

3. The ultra-thin narrow-bezel panel light as claimed in claim 1, further comprising a power box disposed between the base plate and the bezel, wherein the power box has a plurality of zones for containing a power source, connecting terminals and a quick-connecting terminal respectively.

4. The ultra-thin narrow-bezel panel light as claimed in claim 3, wherein the power box has a detachable cover and a main body, wherein each of sides of the detachable cover is provided with a plurality of first teeth and the main body is provided with a plurality of second teeth engaged with the first teeth.

5. The ultra-thin narrow-bezel panel light as claimed in claim 4, wherein a wire outlet of the detachable cover is provided with a plurality of third teeth and a wire outlet of the main body is provided with a plurality of fourth teeth, wherein a wire is clamped by the third teeth and the second teeth.

6. The ultra-thin narrow-bezel panel light as claimed in claim 1, wherein an edge of the base plate is provided with a bending portion, the bezel has a position-limiting recess, and the bending portion is disposed in the position-limiting recess.

7. The ultra-thin narrow-bezel panel light as claimed in claim 6, wherein the base plate has a plurality of locking holes, an inner side of the bezel is provided with a groove, a plurality of locking elements penetrate through the locking holes respectively and reach the groove, wherein ultra-thin narrow-bezel panel light further comprises a power box, each of two sides of the power box is provided with a locking portion, and the locking elements penetrate through the locking portions respectively and reach the groove.

8. The ultra-thin narrow-bezel panel light as claimed in claim 1, wherein the base plate further has a bottom wall and the side walls are disposed around the bottom wall, wherein an edge of the bottom wall is provided with a reinforcement rib adjacent to the side walls and the height of the reinforcement rib is 1 mm~2 mm.

9. The ultra-thin narrow-bezel panel light as claimed in claim 1, wherein any one of the side walls is connected to the side wall adjacent thereto via an inclined portion and an inclination of the inclined portion is 30°~50°, wherein each of the side walls has an inclined plane and an inclination of the inclined plane is 45°~80°.

* * * * *